Nov. 14, 1950          C. S. ASH          2,530,322
PROCESS OF RECOVERING SOLUBLE SOLIDS FROM FRUIT WASTE
Filed Dec. 21, 1948
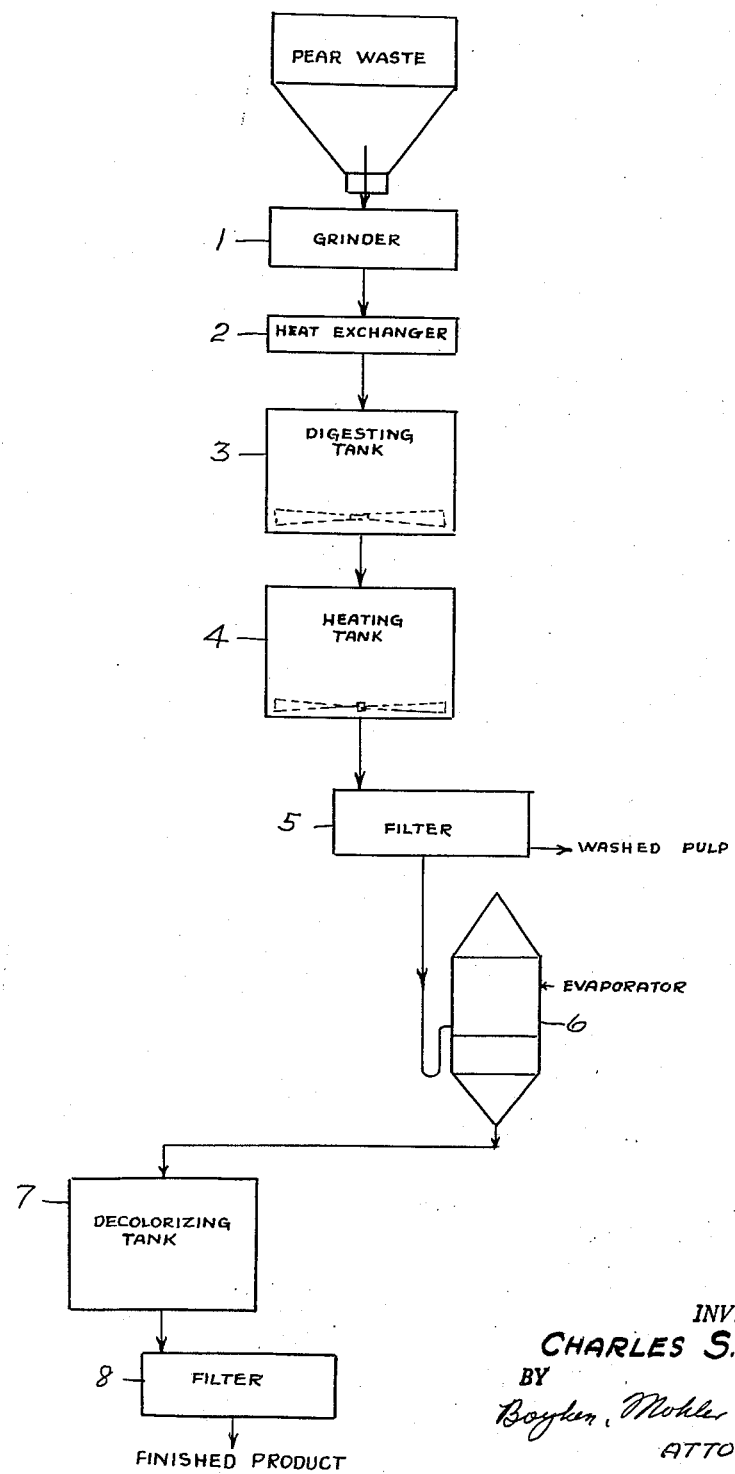
INVENTOR.
CHARLES S. ASH
BY
Boyken, Mohler & Beekley
ATTORNEYS.

Patented Nov. 14, 1950

2,530,322

UNITED STATES PATENT OFFICE 2,530,322

PROCESS OF RECOVERING SOLUBLE SOLIDS FROM FRUIT WASTE

Charles S. Ash, San Francisco, Calif.

Application December 21, 1948, Serial No. 66,486

2 Claims. (Cl. 99—100)

This invention relates to the recovery of soluble solids, such as sugar, from fruit.

Heretofore in the processing of fruit, such as is done in canneries and packing plants, there is considerable waste material. Fruit peelings, cores, defective fruit, culls, etc. may constitute the waste material.

Where the sugar is easily extracted from the waste material, or from the insoluble solids, this may be done, and the insoluble solids may be disposed of for stock food or for any other suitable purpose.

However, in the case of fruit waste from such fruit as pears, cling peaches and others, it has not heretofore been deemed possible from a practical standpoint to effect a proper separation of the soluble solids from the insoluble solids, and the waste material has either been dumped on the soil for such fertilizing or mulch benefits as may be derived therefrom, if any, or else it has been dumped in waterways or in bays. When dumped on the ground the material will decay, giving off offensive odors, and when dumped in waterways or in bays the water is polluted and is destructive of fish life, hence both methods of disposal are objectionable and are illegal in some States.

In the case of pears the wastes generally contain from twelve to sixteen percent sugar. Assuming that no more than ten percent of the sugar were recoverable, this would amount to two hundred pounds of sugar from each ton of waste material, the value of which would be sufficient to make the step of expressing the juice (containing soluble solids) from the waste material a very profitable step instead of being a loss, if there were an economical and practical way of doing it, which has not heretofore been the case.

The principal object of the present invention is the provision of a process whereby the soluble solids in fruit wastes, such as pears, cling peaches, etc. are economically and efficiently recovered.

Another object of the invention is the provision of a process for recovering the soluble solids in fruit wastes that includes the step of destroying the pectin in such wastes before separating the juice from the insoluble solids by pressing or filtration.

The drawing represents a flow pan diagrammatically illustrating the invention.

In detail, the fruit wastes, such as peelings, cores, and other rejected fruit material are first ground by any suitable grinder 1 and are then passed into or through a heat exchanger or any suitable heating device 2 where the temperature of the ground wastes is raised to the proper digesting temperature. This temperature may be between about 32° F. and about 160° F. In the case of pears the preferred temperature will be reasonably close to about 100° F. in a normal set-up with the wastes as they come from a normal peeling and coring operation in a cannery.

From the heat exchanger 2 the wastes are passed into a digester or digesting tank 3, preferably at the most efficient digesting temperature for the waste involved, and a pectin destroying agent, such as pectase or pectinase is added. A commercial product known in the trade as "Pectinol" is satisfactory.

The amount of the pectin destroying agent that is added and the time that the wastes are in the digester are enough to sufficiently destroy the pectin so as to allow a separation of the juice from insoluble solids, such as the seeds, pulp, fiber, etc.

Assuming 100 gallons of waste ground pear material at 100° F. is in the digester, the amount of the pectin destroying agent will be between about one pound and about five pounds, and the time required for effecting the desired digestion will be about ten to fourteen hours, usually about twelve hours.

The amount of digesting material and the digesting temperature and the time the material is in the digester obviously may vary. The digestion takes place more rapidly at about 100° F., which is preferred. If a lower temperature is used, the time for digestion will be longer. Also the quantity of digesting and the time required to complete the necessary digestion may vary somewhat. The waste material from one variety and lot of pears from one locality may differ from the same variety from another locality, and the requirements for one variety may be different from those of another variety from the same or from a different locality. However, anyone skilled in the art can very readily adjust the time, temperature, and amount of digesting agent relative to the mass of pear or other fruit waste to obtain the best results.

After digestion is completed the mass at the temperature in the digester is passed to a tank 4 where it is heated to a proper temperature to coagulate the albumins, which temperature is between about 140° F. and about 212° F., preferably about the latter.

Upon coagulation of the albumins, which requires about five minutes or less at about 212° F., or while the mass is in tank 4, water may be added, and also a filter aid, and the material may then be pressed or filtered hot at between say about 140° F. and about 212° F. in any suitable press or filter 5.

The filtrate (soluble solids) comprises sugars, acids, etc. and may be evaporated in an evaporator 6, if required, to the desired density, and may then be decolorized in the usual manner in a decolorizing tank 7 with activated carbon.

The decolorized product may then be again passed through a filter 8 where the carbon is removed, and the resultant filtrate consists of practically colorless sugar syrup and is in a finished condition.

As already mentioned before, the main purpose of the present invention is to recover the soluble solids in fruit waste that has heretofore resisted such recovery. In the foregoing description it is seen that this is accomplished by grinding the waste and then destroying the pectin therein, and thereafter separating the soluble solids from the insoluble solids, the sugar being in the former.

The process employed is one that may obviously be varied as to times, temperatures, and relative weights or volumes of material, inasmuch as waste products are not uniform in pectin content and other characteristics. However, the process as hereafter claimed is applicable to all fruit wastes where the problem is the same.

I claim:

1. The process of recovering soluble solids, such as sugar, from fruit waste that comprises the steps; grinding said waste, then digesting said waste in the presence of a pectase until substantially all of the pectin is destroyed, then coagulating the albumins in the digested waste and finally separating the insoluble solids from the soluble solids.

2. The process of recovering soluble solids, such as sugar from pear waste and the like that comprises the steps; grinding said waste, then digesting said waste in the presence of a pectase until substantially all of the pectin is destroyed, coagulating the albumins in the digested waste by heating to a temperature of approximately 212° F., and subsequently separating the soluble solids from said mixture by filtration.

CHARLES S. ASH.

REFERENCES CITED

The following references are of record in the file of this patent:

UNITED STATES PATENTS

| Number | Name | Date |
|---|---|---|
| 1,991,242 | Cole et al. | Feb. 12, 1935 |